Jan. 17, 1928.                W. DUQUAINE ET AL                1,656,698
                                ELECTRIC FLYTRAP
                                Filed April 14, 1927
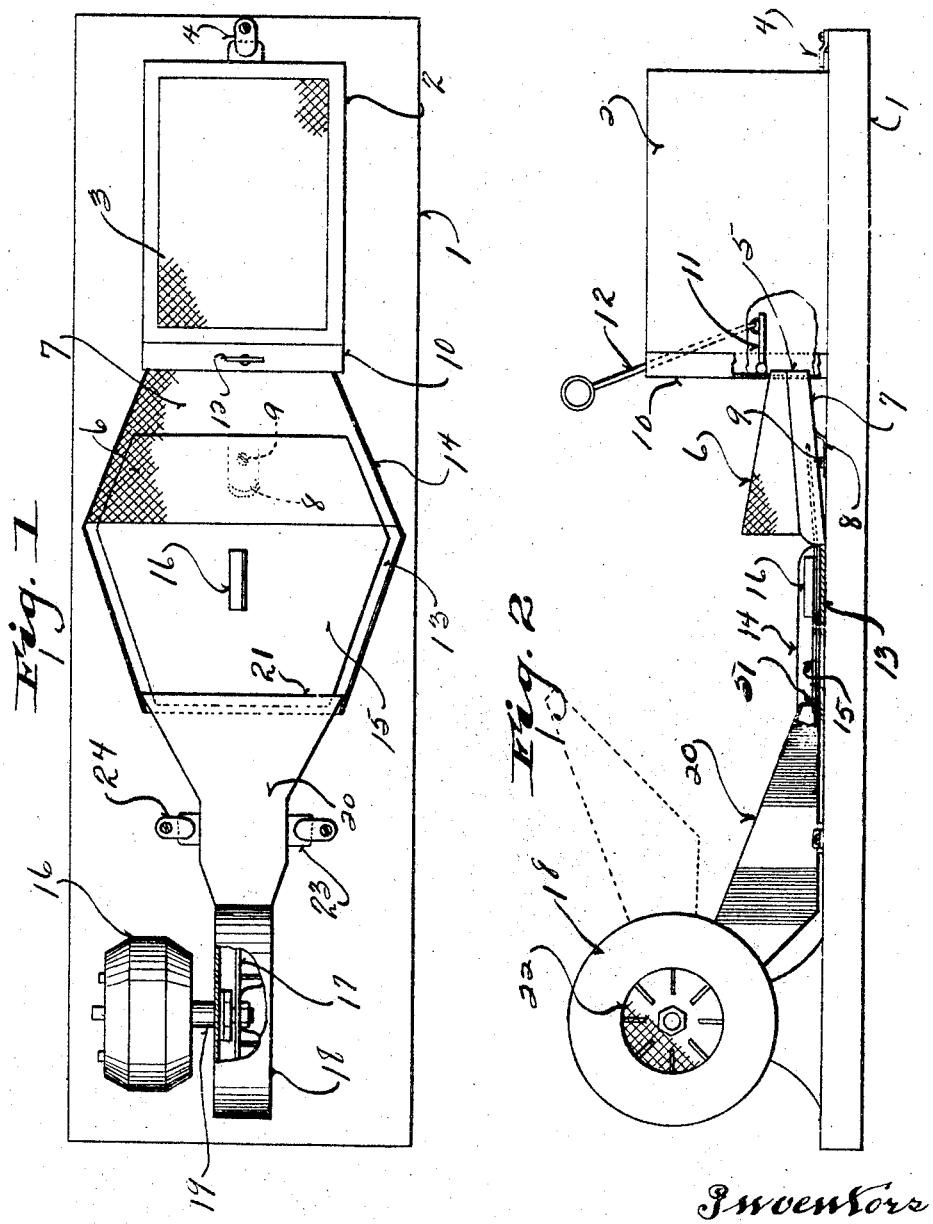
Inventors
William Duquaine
Henry M Peterson
By
Attorneys Patented Jan. 17, 1928.

1,656,698

UNITED STATES PATENT OFFICE.

WILLIAM DUQUAINE AND HENRY M. PETERSON, OF MARINETTE, WISCONSIN.

ELECTRIC FLYTRAP.

Application filed April 14, 1927. Serial No. 183,728.

This invention relates to an electric fly trap.

Objects of this invention are to provide a novel form of fly trap in which means are provided for attracting the flies to a certain definite position and associated with a fan for producing a blast of air directed as a sheet across the fly attracting means and adapted to drive the flies into a removable cage.

Further objects are to provide a novel form of fly trap which may be moved about as a unit and may operate either as a fly trap when actually needed for such work, or may be slightly altered to provide for ventilation or else to provide a blast of air for drying the hair, etc.

An embodiment of the invention is shown in the accompanying drawings in which:—

Figure 1 is a plan view of the device with parts broken away;

Figure 2 is a side elevation with parts broken away.

Referring to the drawings, it will be seen that the fly trap is carried by a base 1 which may be of any suitable material and which supports the entire device as a unit permitting it to be readily moved about wherever needed.

The base carries a fly receiving cage 2 which may be provided with a mesh top 3 and, if desired, with a mesh back. This cage is removably held in place at its rear by means of a clip 4 and at its front is adapted to be positioned beneath the delivery mouth 5 of a flaring guide or chute 6, such chute being preferably formed at its sides and top of wire mesh and at its bottom of sheet metal, as indicated at 7 in Figure 2. It is held in place in any suitable manner as by means of the clip 8 which is fastened to the base by means of a screw 9. The cage is provided with a removable front 10 which carries a door 11 hingedly mounted and controlled by the rod 12, so that when the cage is not receiving flies, the door may be closed to temporarily retain the flies in the cage. After the flies have been trapped the cage is removed with the door closed and the flies disposed of in any suitable manner.

A permanently attached tray 13 is carried by the base and is provided with marginal flanges 14. This tray may, if desired, form the bottom of the chute 6 and may be integral with the portion 7 shown in Figure 2.

A removable tray or plate 15 conforming roughly to the outline of the tray 13 is adapted to rest upon the tray 13 and is provided with a manipulating handle or clip 16. This removable tray may be smeared over with the fly attracting material and may also be removed for cleaning whenever desired.

An electric motor 16 is carried by the base and drives a fan 17 carried within a housing 18. The housing is pivotally mounted upon the stationary hub or bearing 19 of the motor and may be rocked into the full line position shown in Figure 2, or into the dotted line position. This casing 18 has a delivery portion 20 which is flared laterally and contracts vertically to provide a slit-like mouth or discharge portion 21 which conforms to the forward end of the tray 13. The central portion of the casing 18 is open on one side, as indicated at 22 in Figure 2, to permit air to enter and to be subsequently driven therefrom at a high velocity by means of the fan. The flaring discharge portion 20, or nozzle, is rigidly formed with the casing and is provided with laterally extending ears 23 (see Figure 1) which are temporarily retained in place adjacent the base by means of the clips 24.

In using the device the removable plate 15 is smeared with the fly attracting material and the fan started, thus causing a sheet-like blast of air to sweep violently over the upper surface of the tray or plate 15 and to consequently drive any flies that may attempt to alight thereon into the contracting chute 6 and from thence into the cage 2.

It will be seen that the flies will not be aware of the rapidly traveling sheet of air immediately adjacent the plate 15 and, consequently, will attempt to alight thereon. However, at the instant they attempt to alight they are entrained by the blast of air and driven into the cage. Obviously, while the device is in active operation there is such a blast of air into the mouth or doorway of the cage that the flies can not leave by this route. After the machine is stopped, the door 11 is closed to prevent exit of the flies.

When the device is not in use as a fly catcher, it may be adjusted for ventilation purposes or may be used to deliver a blast of air for drying the hair or similar uses. Under these conditions the clips 24 are turned outwardly from the ears 23 and the nozzle or delivery portion 20 is rocked into the dotted line position shown in Figure 2 to thus direct a blast of air outwardly at any desired angle.

It will be seen that a novel form of fly trap has been provided by this invention which may be cheaply constructed, which is highly effective in operation, and which may be moved about as a unit to any point desired.

Although the invention has been described in considerable detail such description is intended as illustrative rather than limiting as the invention may be variously embodied and as the scope of such invention is to be determined as claimed.

We claim:

1. A fly trap comprising a base, an electric motor carried thereby and provided with a fan, a housing associated with said fan and having a delivery slit-like portion, a removable cage carried by said base and having a doorway directed towards said delivery portion of said casing, and an intermediate tray located between said delivery portion and the door of said cage and adapted to receive fly attracting material.

2. A fly trap comprising a base, an electric motor carried thereby and provided with a fan, a housing associated with said fan and having a delivery slit-like portion, a removable cage carried by said base and having a doorway directed towards said delivery portion of said casing, and an intermediate tray located between said delivery portion and the door of said cage and adapted to receive fly attracting material, said cage having a door which may be retained either open or closed and having a removable end.

3. An electric fly trap comprising a base, a tray rigidly carried by said base and having an inwardly contracting portion at its rear end, a cage removably carried by said base adjacent the rear end of said tray and having a mouth opening into said tray, the contracted rear end of said tray having an upper and a side closure therefor, a nozzle having a slit-like opening positioned adjacent the forward end of said tray, a casing communicating with said nozzle, a fan located within said casing for projecting a blast of air through said nozzle, and an electric motor for driving said fan.

4. An electric fly trap comprising a base, a tray rigidly carried by said base and having an inwardly contracting portion at its rear end, a cage removably carried by said base adjacent the rear end of said tray and having a mouth opening into said tray, the contracted rear end of said tray having an upper and a side closure therefor, a nozzle having a slit-like opening positioned adjacent the forward end of said tray, a casing communicating with said nozzle, a fan located within said casing for projecting a blast of air through said nozzle, an electric motor for driving said fan, and a removable plate adapted to receive fly attracting material.

5. In a device of the class described, the combination of a base, a tray rigid therewith and having a housed and contracted rear end, a cage removably carried by said base and having a doorway communicating with the rear end of said tray, said cage having a removable front end provided with a door for closing said doorway, a removable plate positioned upon said tray and adapted to receive fly attracting material, an electric motor carried by said base, a housing pivotally mounted upon the electric motor and having a fan therein driven by said motor, said housing having a delivery nozzle of slit-like formation positioned adjacent the front edge of said tray, said nozzle being rigid with said housing, and clips for removably holding said nozzle in position, whereby said nozzle and housing may be rocked about their pivotal connection with said motor.

In testimony that we claim the foregoing we have hereunto set our hands at Marinette, in the county of Marinette and State of Wisconsin.

WILLIAM DUQUAINE.
HENRY M. PETERSON.